United States Patent Office 3,552,785
Patented Jan. 5, 1971

3,552,785
ELASTIC JOINT ASSEMBLY FOR AUTOMOBILE
SUSPENSION STRUT RODS
Clifton L. Elder, Hazelwood, Mo., Lawrence H. Fitch, Cahokia, Ill., Ronald I. Kornblum, University City, Mo., and William C. Wehner, Detroit, Mich., assignors to Moog Industries, Inc., St. Louis, Mo., a corporation of Missouri
Filed Aug. 22, 1968, Ser. No. 754,622
Int. Cl. B60g 11/18
U.S. Cl. 287—85                                     8 Claims

ABSTRACT OF THE DISCLOSURE

A bushing assembly for yieldably connecting the torward end of the strut rod of a vehicle wheel suspension assembly to a part of the chassis or frame. The bushing assembly needs to be pliable or yieldable as the strut rod pivots about a point on the frame which is different from the control arm pivot point also on the frame. The bushing assembly forms the strut rod pivot and must be pliable to avoid destruction resulting from tension, compression and shear forces imposed thereon.

---

This invention pertains to improvements in the bushing assembly for connecting one end of a wheel suspension strut rod to the chassis or frame of a vehicle.

In certain configurations of vehicle wheel suspension assemblies, the steerable wheel mounting spindles are supported by a pair of control arms carried by the vehicle frame. One control arm of the pair, usually the upper arm, is provided at its outer end with a ball joint attachment to the spindle bracket and its inner end is connected at two spaced points on the frame so that there is adequate stability for absorbing fore and aft thrust forces while the arm is free to pivot vertically as the wheel follows the road surface. The other or lower control arm is also connected at its outer end by a ball joint attachment to the spindle bracket, and its inner end is connected by a spindle point to the frame and thus has very limited stability to absorb fore and aft thrust forces even though it is free to pivot vertically in unison with the first mentioned control arm.

The problem encountered with the wheel suspension assembly above briefly described is in obtaining durable stability means for the lower control arm having the single pivot connection with the frame. At the present time stability is achieved by the application of a strut rod connected at one end to the outer end of the lower control arm near the wheel spindle bracket. The other end of the strut rod is connected to the vehicle frame at some point different from the single pivot connection of the lower control arm so that the latter arm is afforded widely spaced connections on the frame to impart fore and aft stability in absorbing thrust loads. This need calls for a strut rod that differs in length from the lower control arm which it is called upon to stabilize. Thus the different lengths of the lower control arm and strut rod results in these two members swinging about different radii on the frame, and in this configuration, in order to hold the steerable wheel mounting spindle in predetermined position, the strut rod pivot connection must yield relative to the vehicle frame.

Considering the geometry of the above described wheel suspension assembly, there is a definite need to provide a pliable or yieldable attachment point for the strut rod. The strut rod acts to limit the forward or backward movement of the control arm while moving vertically with the spindle bracket. Since the strut rod pivots relative to the frame on a radius that has a different length from the radius of the lower control arm, the strut rod bushing connection at the frame is forced to yield so as not to cause the spindle bracket to move in an undesirable manner which would seriously affect the steering of the vehicle wheel. Another requirement or condition of the strut rod is to resist wheel motion when the wheel encounters a hole in the road, or when the brakes are applied, thereby limiting movement of the wheel spindle and bracket which could be pushed forward or pulled backward by a force that could bend the lower control arm out of alignment.

The bushing assemblies usually employed with strut rods are quick to disintegrate because of the compromise in structure to accommodate the difference in pivot points, and because of the need to accommodate the difference in motions as the wheel moves vertically to follow the road surfaces. Thus, varied forces and motions are imposed on the bushing assemblies and the present types of bushing assemblies and the present types of bushing components have failed to stand up for any useful length of time.

It is, therefore, an important object of this invention to provide a novel and useful bushing assembly for wheel suspension strut rods that will overcome the problems currently encountered by prevailing strut rod bushing assemblies.

It is also an important object of this invention to provide a strut rod bushing assembly that will be pliable or yieldable for the reasons above given, and will have significantly greater resistance to disintegration in service.

Another object of this invention resides in the novel and simple form of the several components and parts of strut rod bushings to achieve long life and reduce noise.

Several preferred forms of bushing assemblies will be described in more detail, but in each such form the pliable pads are mounted between the frame and the strut rod end by non-yieldable parts which protect the pads from being pinched and torn in service. Means are provided in the pads so that a firm grip on the frame is obtained with a minimum of metal-to-metal contact for noise suppression, and the pads are protected against pinching and tearing by sleeve and washer means that allow the pads to deform as required. The invention resides also in the several components and parts hereinafter to be described in connection with the several views of the drawings, wherein:

Figure 1:
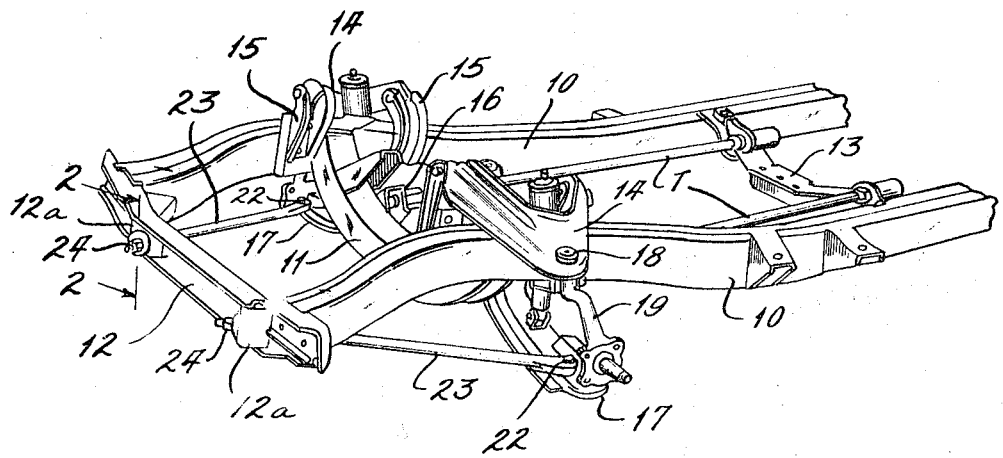
FIG. 1 is a fragmentary perspective view of a typical vehicle chassis front end assembly showing steering wheel mounting spindles operably connected by upper and lower control arms and a strut rod.

In FIG. 1 the front end of a vehicle chassis or frame includes the longitudinal members 10 that are cross connected by a principal transverse frame member 11 and a front transverse frame member 12. Torsion bars T are anchored in a frame part 13. A part of the frame includes the bracket structure 15 to which the inner ends of the upper control arms 14 are pivotally connected. The outer end of each upper control arm carries a suitable ball joint 18 to be connected to the wheel spindle bracket 19. Another ball joint (not shown) is carried at the outer end of each lower control arm 17. Each of the latter arms 17 has its inner end 16 connected into an adjacent torsion bar T. The usual shock absorber is disposed between the structure 15 and each of the lower arms 17.

The upper control arm 14 is stable in the fore and aft directions due to the widely spaced pivot points adjacent the structure 15 on the frame member 10. The lower control arm 17, on the other hand, is not stable in the fore and aft direction because it has only a single pivot at the inner end 16, and in order to obtain stability a strut rod 23 is utilized. The rearward end 22 of each strut rod 23 is fastened into the outer end of one of the lower control arms 17 and the forward end is connected into the transverse member 12. The strut rod 23 protects the lower control arm 17 from being bent under severe stress conditions, as for example, when the vehicle wheel hits a hole in the road or the brakes are applied suddenly. The present invention is therefore concernd with the attachment of the forward end of the strut rod 23 to the transverse member 12 so as to permit the strut rod to pivot vertically with the lower control arm 17 and accommodate itself to the difference in the radius arm length. It can be observed in FIG. 1 that the lower control arm 17 is not as long as the strut rod 23 between the point 22 where it connects into the lower control arm 17 and the mounting connection on the transverse member 12.

Figure 2:
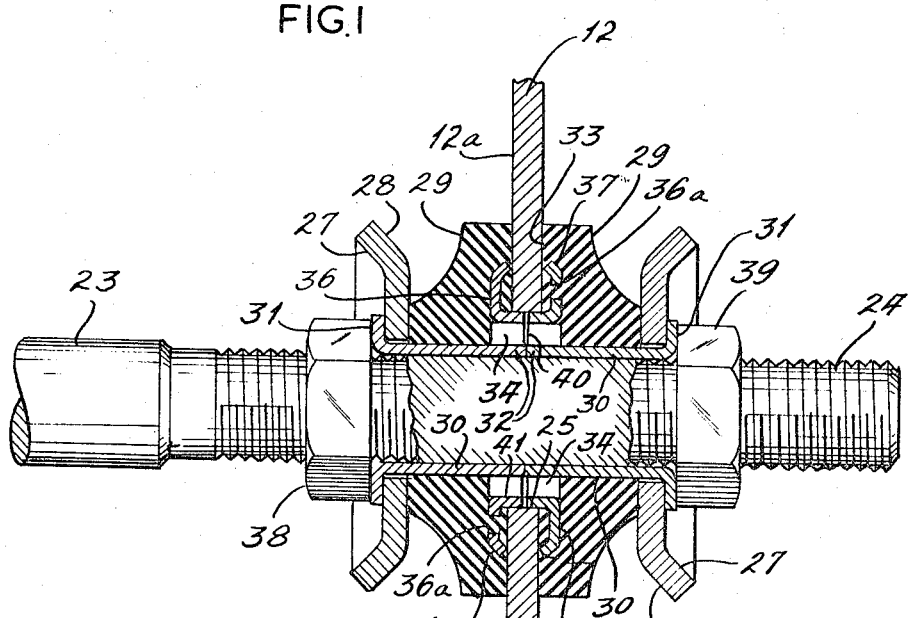
FIG. 2 is a fragmentary longitudinal sectional view of one form of strut rod bushing assembly incorporated in the assembly of FIG. 1.

Turning now to FIG. 2, the forward end 24 of the strut rod 23 is suitably threaded to receive the parts of the bushing assembly now to be described. It is also seen that the threaded portion 24 of the strut rod passes through an opening 25 in the wall 12a of the transverse member 12, and such opening 25 is larger in diameter than the threaded end 24 of the strut rod. Not all installations employ a fully threaded end 24 on the strut rod, so no limitation in this respect is to be implied.

A pliable bushing assembly is mounted on the threaded end 24 and comprises a pair of sub-assemblies 26 which are generally identical but assembled on the strut rod end 24 from opposite sides of the wall 12a of the transverse member 12. Each sub-assembly 26 (FIG. 3) includes an enlarged thrust washer 27 having a convex or curved working face 28 facing inwardly to be abutted by an oil resistant synthetic rubber or plastic bushing pad 29. The washer 27 and the bushing pad 29 are pre-assembled on an inner axial sleeve 30 which has an outer flanged end 31 for retaining the washer 27 in position. The bushing pad 29 may be press-fitted over the sleeve 30 so as to retain itself and the washer 27 in position on the sleeve against the sleeve flange 31. The inner end 32 of each sleeve 30 when compressed in final assembly projects axially beyond the enlarged radial faces 33 of the bushing pads 29 and there is an annular recess 34 formed in each bushing so that the inner end 32 of the sleeve is exposed. Each bushing pad 29 includes a metallic core element 36 which is suitably embedded in the bushing pad 29 so that the pad material passes through several openings as indicated at 36a. The core element 36 is provided with a plurality of tangs 37 which are exposed in the end face 33 of the bushing so as to provide a secure grip against rotation and wobble relative to the wall 12a without relying on complete engagement throughout 360° of the core element 36. Providing a few circumferentially spaced tangs 37 for obtaining the secure grip in the manner indicated substantially reduces the noise that would otherwise be generated between these two parts during vehicle operation.

Figure 3:
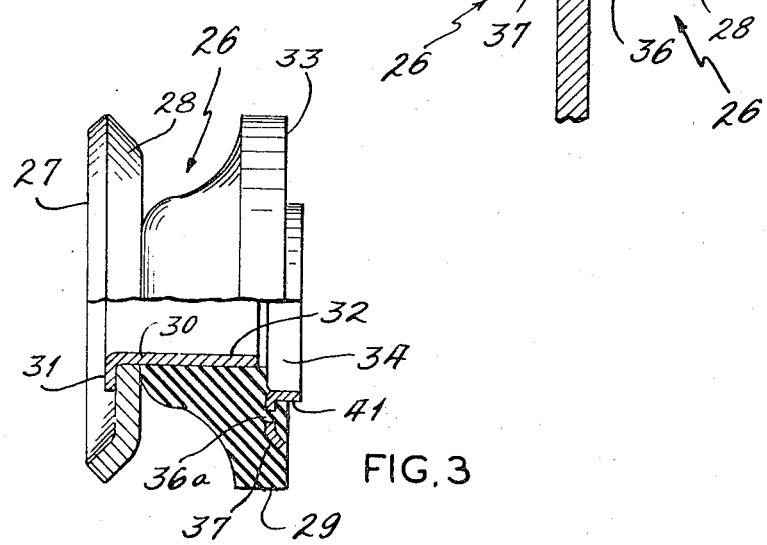
FIG. 3 is a fragmentary sectional view of a subassembly of the bushing.

The bushing assembly of FIG. 3 is mounted on the threaded end 24 of the strut rod 23 by running up a nut 38 on the end 24 so as to form a stop for one of the sub-assemblies 26. The bushing sub-assembly 26 is then slipped over the end 24 and the end of the strut rod 24 is then inserted in the opening 25 of the frame wall 12a so that its outer free end is in posiiton to receive the co-operating sub-assembly 26 which is placed over the threaded end 24 and is secured by a second nut 39. The nuts 38 and 39 may be threaded in and out along the length of the strut rod end 24 to obtain the proper caster. As noted above the fully threaded end 24 may not always be necessary and in such event the nut 38 can be a fixed shoulder on the strut rod 23 and the assembly will then be secured by the nut 39 without any ability to be adjustable lengthwise of the strut rod 23.

When the two bushing sub-assemblies 26 are in proper position the ends 32 of the inner sleeves 30 come into abutment thereby forming a gap or space 40 between the bushing sub-assemblies in the zone of the recesses 34. This is an important characteristic since it initially assures that the pliable bushing parts 29 will have the required degree of freedom without being pinched or crowded against each other in the unstressed state. The embedded core elements 36 are provided with axially directed flanges 41, and the diameter of each of the flanges 41 is sized to substantially match the opening 25 in the frame wall 12a so that the respective bushing sub-assemblies 26 are operably centered and operate to position the strut rod end 24 centrally of the wall opening. During vehicle operations, pivoting and thrust or tension loads transmitted by the strut rod 23 cause the pliable bushing pads 29 to flex as required to accommodate the action of the strut rod 23 and the tendency for the threaded end 24 to work back and forth and angularly in the wall opening 25.

Another important feature of the bushing sub-assemblies 26 resides in the provision of the annular recess 34 so that there will be a space provided for the pliable pads 29 to work in as the strut rod 23 is moved angularly in the wall opening 25. Thrust and tension loads are more easily resisted by the pliable pads 29 working against the smooth curved surface 28 of the washer 27. The inner sleeves 30 have flanges 31 which back up the washer 27 and prevent the bushing pads 29 from being extruded into the opening between the washer 27 and the threads of the strut rod end 24. Without the sleeves 30 or equivalent parts the pliable material of the pads 29 woud be extruded against the threads and ultimately would be chewed up to the point of destruction of the bushing assembly.

Figure 4:
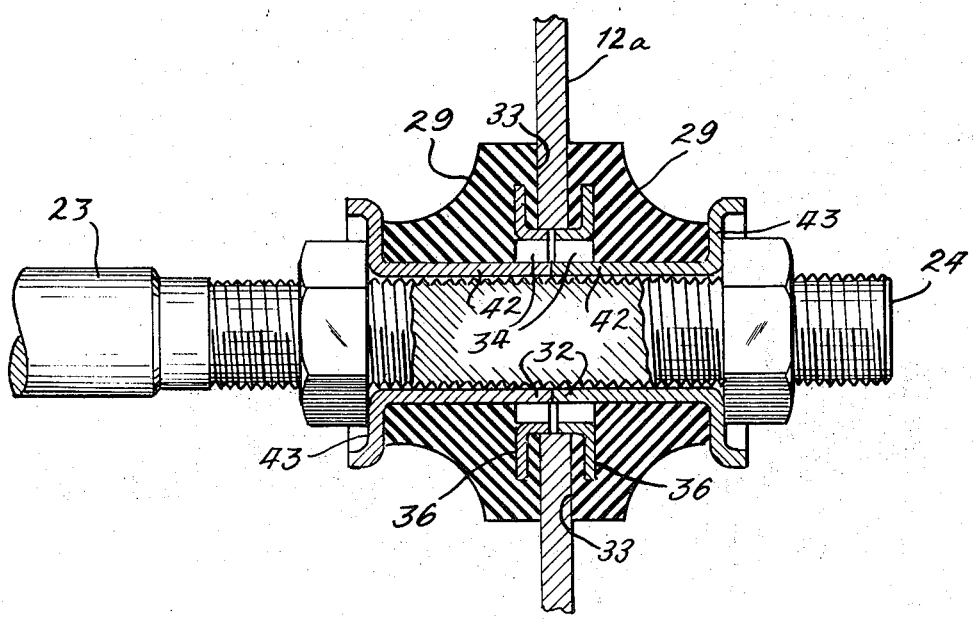
FIG. 4 is a view similar to FIG. 2 but illustrating a variant form of the bushing assembly.

In FIG. 4, there is shown a similar form of strut rod bushing wherein like parts and elements are referred to by similar reference characters as in the assembly of FIG. 2. The modification shown in FIG. 4 has to do with the forming of washer 27 and the sleeves 30 as an integral part and therefore this is illustrated by the member having an axially directed sleeve portion 42 formed with an outer radially directed washed portion 43 so as to form a seat for the pliable bushing pad 29. In other respects the assembly is substantially identical with that shown in FIG. 2. An important characteristic of the bushing assembly shown in FIGS. 2 and 4 is that the components assembled on each side of the frame wall 12a are not permitted to rotate or wobble. All that the service operator or repairman has to remember is that the enlarged flat surface 33 of the pliable pads 29 go against the wall 12a of the transverse member 12 and the adjusting nuts 38 and 39 go adjacent the washer 27 or 43 as the case may be.

Figure 5:
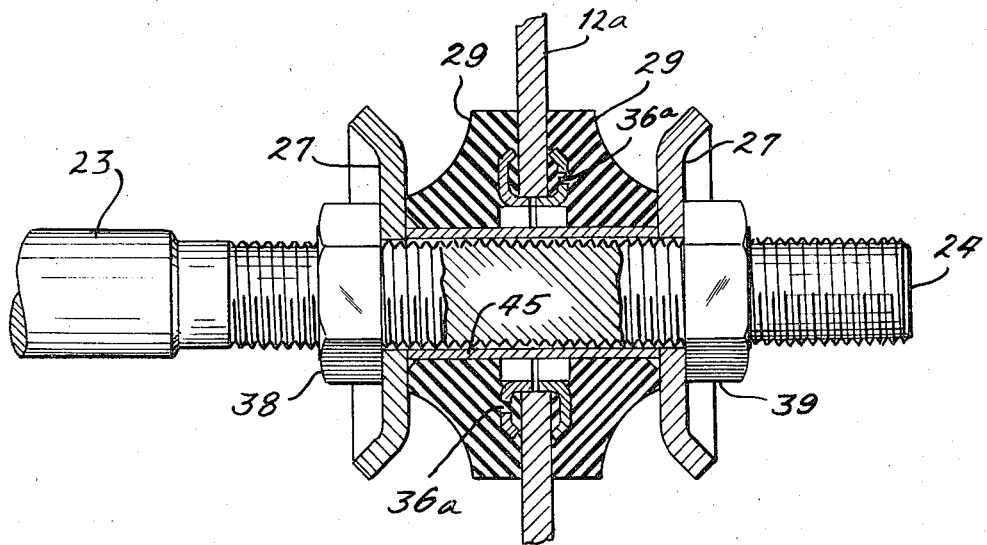
FIG. 5 is another form of bushing assembly incorporating certain features of the invention.

Turning now to FIG. 5, there is shown a strut rod bushing assembly composed of a group of loose parts which must be assembled in the order shown in the drawing to be correctly operable. In this modification the pliable pads 29 are identical with that shown in FIG. 2. One difference is that instead of having separate sleeves 30 there is a single sleeve 45 which bridges both of the pliable pads 29 and is of sufficient length so as to be engaged by the washer 27 and to prevent the material of the bushing pads 29 being pinched off by the ends of the sleeve 45. This problem of pinching the pads 29 can be overcome by internally beveling the outer ends of the bores in the pads. In the drawings the parts are shown assembled and consequently the beveling is taken up and can't be seen. Adjusting nuts 38 and 39 retain the bushing parts in assembly. In all other respects the bushing parts are similar to the assembly shown in FIG. 2, and where possible similar reference numerals have been utilized to designate similar parts.

The foregoing description has set forth the details of form and assembly of certain presently preferred strut rod bushing assemblies. It is important to the proper working of the bushing assembly to maintain as much area contact as is possible between the pliable bushing pads 29 and the adjacent surface of the wall of the transverse member 12. One way to accomplish this is to apply a suitable adhesive material between the pliable pads 29 and the wall 12a. By so doing the bushing pads 29 are caused to undergo working reaction around the inner sleeves and against the enlarged end washer where there are no sharp surfaces that might result in cutting and grinding destruction of the pliable material. The material for the pliable pads 29 may be any of the oil resistant synthetic rubber materials or even certain of the pliable plastic materials. Such materials are well known and need not be set forth here in detail.

The foregoing description has set forth the characteristics of certain improved strut rod bushing assemblies which are presently preferred. However, it is understood that changes and modifications may be suggested to those skilled in this art from the foregoing specification and it is intended that all possible changes and modifications be included herein.

What is claimed is:

1. A strut rod bushing assembly for connecting a strut rod to a vehicle frame member having an opening therein, said bushing assembly including a pair of pliable bushing bodies having bores therethrough to receive the strut rod and enlarged faces adjacent one end of said bores, means carried by said bushing bodies adjacent said faces to project therefrom and locate said bushing bodies adjacent the frame opening, said locating means maintaining said enlarged faces of said bushing bodies spaced apart and free of entry into the frame opening, thrust washer means engaged upon each bushing body opposite its enlarged face and sleeve means mounted in said bores and extending inwardly from said washer means to isolate said bushing bodies from engaging the strut rod.

2. The bushing assembly of claim 1 wherein each bushing body is formed with an annular recess at one end of said strut rod receiving bore and said bushing body locating means being formed with an axially extended tubular projection which defines the outer wall of said annular recess.

3. The bushing assembly of claim 1 wherein each bushing body and locating means are molded into an integral assembly.

4. The bushing assembly of claim 1 wherein said locating means is formed with tangs disposed outwardly of said locating means and adjacent said enlarged faces to grip the frame and prevent rotation and wobble of said bushing bodies in the frame member.

5. In a bushing assembly mounting a vehicle wheel suspension strut rod for relative movement in a frame aperture, the bushing assembly improvement comprising: a pair of bushing pads formed of pliable material and being symmetrical about the axis of an axial bore extending through each pad, a frame abutting face adjacent one end of said axial bore formed with a central recess axially aligned with said bore, and an opposite end face adjacent the opposite end of said axial bore; a core element embedded in each bushing pad with a flange positioned in said central recess to exclude entry of said pad into the frame aperture and at least one element adjacent the plane of said frame abutting face and spaced radially outwardly from said central recess; sleeve means fitted in said axial bore of said pads to slide over the strut rod, and means adjacent the opposite ends of said sleeve means forming thrust surfaces abutting said opposite end faces of said pads.

6. The bushing assembly of claim 5 wherein said thrust surfaces are formed with a convex working face abutting the opposite end face of said pads and extending radially outwardly beyond said pads.

7. A bushing assembly for vehicle wheel suspension strut rods comprising:
(a) a pair of resilient pads each having
 (1) facing surfaces and remote surfaces,
 (2) a bore opening axially through said facing and remote surfaces and an enlarged recess adjacent the end of the bore opening through said facing surfaces, and
 (3) an element embedded therein adjacent said enlarged recess with a portion thereof exposed at said facing surface;
(b) a thrust member for each pad having an enlarged surface abutting said remote surface of said pad and extending radially therebeyond; and
(c) sleeve means mounted in the axial bore of said pads to align said pads and thrust members, the alignment of said pads aligning said enlarged recesses and said exposed portion of said embedded elements, and said sleeve means being sized to receive a strut rod and prevent contact between said pads and the strut rod.

8. The bushing assembly of claim 7 wherein said embedded elements each have elements thereon embedded in the pads in positions to project axially from said facing surfaces at locations radially outwardly from said enlarged recesses in said facing surfaces, the axial projection of said elements establishing contact with a portion of the vehicle.

References Cited
UNITED STATES PATENTS

| | | | |
|---|---|---|---|
| 1,823,429 | 9/1931 | Jansson et al. | 248—9 |
| 2,675,202 | 4/1954 | Kemmerling | 248—10X |
| 2,792,215 | 5/1957 | Timpner et al. | 287—85X |
| 2,868,571 | 1/1959 | Owen | 287—85 |
| 3,035,799 | 5/1962 | Peirce | 248—15 |
| 3,079,137 | 2/1963 | Schilberg | 280—96.2X |
| 3,178,200 | 4/1965 | Backaitis et al. | 280—96.2 |

A. HARRY LEVY, Primary Examiner

U.S. Cl. X.R.

248—358; 267—67; 280—124; 287—52.07